(12) United States Patent
Lee et al.

(10) Patent No.: US 8,327,959 B2
(45) Date of Patent: *Dec. 11, 2012

(54) WALKING ROBOT

(75) Inventors: Youn Baek Lee, Suwon-si (KR); Yeon Taek Oh, Yongin-si (KR); Soo Sang Yang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 710 days.

This patent is subject to a terminal disclaimer.

(21) Appl. No.: 12/385,263

(22) Filed: Apr. 2, 2009

(65) Prior Publication Data

US 2009/0294187 A1 Dec. 3, 2009

(30) Foreign Application Priority Data

May 30, 2008 (KR) .................. 10-2008-0050847

(51) Int. Cl.
*B62D 57/02* (2006.01)
(52) U.S. Cl. .................................. 180/8.6; 318/568.12
(58) Field of Classification Search ............. 180/8.6, 180/8.5, 8.1; 318/568.11, 568.12, 568.2
See application file for complete search history.

(56) References Cited

U.S. PATENT DOCUMENTS

| | | | | |
|---|---|---|---|---|
| 3,108,498 | A * | 10/1963 | Hedin et al. | 475/5 |
| 4,797,061 | A * | 1/1989 | Munakata | 414/744.5 |
| 5,222,409 | A * | 6/1993 | Dalakian | 74/479.01 |
| 7,061,200 | B2 * | 6/2006 | Iribe | 318/568.16 |
| 7,111,696 | B2 * | 9/2006 | Miyazaki et al. | 180/8.5 |
| 7,492,115 | B2 * | 2/2009 | Gomi et al. | 318/568.11 |
| 2005/0275367 | A1 * | 12/2005 | Buehler et al. | 318/568.12 |
| 2008/0210477 | A1 * | 9/2008 | Takenaka et al. | 180/8.6 |
| 2009/0301798 | A1 * | 12/2009 | Yang et al. | 180/8.6 |

FOREIGN PATENT DOCUMENTS

KR 10-2001-0050273 6/2001

* cited by examiner

*Primary Examiner* — Anne Marie M Boehler
(74) *Attorney, Agent, or Firm* — Staas & Halsey LLP

(57) ABSTRACT

A walking robot, in which driving structures of a pitch direction hip joint and a knee joint of a leg are enhanced. The walking robot includes a trunk, and a plurality of legs connected to the trunk, at least one leg among the plurality of legs includes a thigh link, a calf link provided at the lower portion of the thigh link, a pitch direction hip joint connecting the trunk and the thigh link and rotating the thigh link against the trunk in a pitch direction, and a knee joint connecting the thigh link and the calf link and rotating the calf link against the thigh link in the pitch direction. The pitch direction hip joint and the knee joint are interlocked with each other and are driven by one interlocking actuator.

19 Claims, 6 Drawing Sheets

WALKING ROBOT

CROSS-REFERENCE TO RELATED APPLICATION

This application claims the benefit of Korean Patent Application No. 2008-0050847, filed May 30, 2008, in the Korean Intellectual Property Office, the disclosure of which is incorporated herein by reference.

BACKGROUND

1. Field

Embodiments of the present invention relate to a walking robot, and more particularly to a walking robot, in which driving structures of a pitch direction hip joint and a knee joint of a leg are enhanced.

2. Description of the Related Art

In general, walking robots having various shapes, such as biped and quadruped shapes, have been developed for household, military, and industrial purposes.

Korean Patent Laid-open Publication No. 2001-0050273 discloses a humanoid, i.e., a biped walking robot.

The humanoid disclosed in Korean Patent Laid-open Publication No. 2001-0050273 includes a trunk, a head provided at the upper end of the trunk, a pair of arms provided at both sides of the upper portion of the trunk, and a pair of legs provided at both sides of the lower portion of the trunk.

Each of the legs includes a thigh link connected to the trunk through a hip joint unit having 3 degrees of freedom, a calf link connected to the thigh link through a knee joint having 1 degree of freedom, and a foot connected to the calf link through an ankle joint unit having 2 degrees of freedom, thus being capable of moving with a total of 6 degrees of freedom. Thereby, various lower body movements as well as walking movements, such as running, walking, etc., can be achieved.

Particularly, the walking movements, such as running, walking, etc., are achieved mainly by repeated rotations of pitch direction hip joints and knee joints, and when a foot contacts the ground, an impact of a considerable degree from the ground is applied to the robot. At this time, it is possible to alleviate the impact to some degree by controlling the pitch direction hip joints and the knee joints.

However, since the respective joints of the conventional walking robot, particularly the pitch direction hip joints and the knee joints, are independently operated by respective actuators having different capabilities, the control mechanism for such is complicated in order to effectively alleviate the impact.

Further, since the actuator for operating the knee joint is disposed adjacent to the knee joint, a large inertial force is generated from the leg while walking and thus applies a large load to the actuator for operating the hip joint.

SUMMARY

Therefore, one aspect of embodiments of the present invention is to provide a walking robot, in which driving structures of pitch direction hip joints and knee joints are enhanced so that a control mechanism is simplified and an inertial force generated from legs while walking is reduced to allow the robot to walk more naturally with a smaller power output.

Additional aspects and/or advantages will be set forth in part in the description which follows and, in part, will be apparent from the description, or may be learned by practice of the invention.

In accordance with one aspect, embodiments of the present invention provide a walking robot comprising a trunk, and a plurality of legs connected to the trunk, wherein at least one leg among the plurality of legs includes a thigh link, a calf link provided at the lower portion of the thigh link, a pitch direction hip joint connecting the trunk and the thigh link and rotating the thigh link against the trunk in a pitch direction, and a knee joint connecting the thigh link and the calf link and rotating the calf link against the thigh link in the pitch direction, and the pitch direction hip joint and the knee joint are interlocked with each other and are driven by one interlocking actuator.

The walking robot may further comprise an independent actuator independently driving the pitch direction hip joint.

The walking robot may further include a planetary gear unit including a sun gear, a ring gear provided at the outside of the sun gear, a plurality of planet gears engaged with the sun gear and the ring gear such that the planet gears rotate and revolve, and a carrier connected to the plurality of planet gears, and the driving force of the interlocking actuator may be inputted to the planetary gear unit through any one of the ring gear and the sun gear and be transmitted to the knee joint simultaneously, the driving force of the independent actuator may be inputted to the planetary gear unit through the other one of the ring gear and the sun gear, and the driving force inputted through the ring gear or the sun gear may be outputted through a carrier and drive the pitch direction hip joint.

Each of the plurality of planet gears may include a first planet gear engaged with the sun gear and a second planet gear engaged with the ring gear, and the first and second planet gears may be axially connected to each other.

The walking robot may further include a speed reducer provided with an input shaft connected to an output shaft of the planetary gear unit and an output shaft connected to a rotary shaft of the pitch direction hip joint.

The walking robot may further include a speed reducer provided with an input shaft connected to a rotary shaft of the interlocking actuator and an output shaft connected to a rotary shaft of the knee joint.

The walking robot may further include a frame provided with one side connected to the trunk and the other side rotatably connected to the thigh link, and the planetary gear unit may be supported by the frame.

The independent actuator may be disposed adjacent to a rotary shaft of the pitch direction hip joint, or be disposed at a position closer to the trunk than the rotary shaft of the pitch direction hip joint.

The interlocking actuator may be disposed adjacent to a rotary shaft of the pitch direction hip joint, or be disposed at a position closer to the trunk than the rotary shaft of the pitch direction hip joint.

The pitch direction hip joint and the knee joint may be interlocked with each other such that the rotating directions of the pitch direction hip joint and the knee joint differ from each other.

The walking robot may further include at least one joint interposed between the trunk and the pitch direction hip joint.

In accordance with another aspect, embodiments of the present invention provide a walking robot comprising legs, each of which includes a first pitch joint and a second pitch joint interlocked with each other; and an interlocking actuator driving the first pitch joint and the second pitch joint simultaneously.

The walking robot may further comprise an independent actuator independently driving the first pitch joint.

The walking robot may further include a planetary gear unit including a sun gear, a ring gear provided at the outside of the sun gear, a plurality of planet gears engaged with the sun gear and the ring gear such that the planet gears rotate and revolve, and a carrier connected to the plurality of planet gears, and the driving force of the interlocking actuator may be inputted to the planetary gear unit through any one of the ring gear and the sun gear and be transmitted to the second pitch joint simultaneously, the driving force of the independent actuator may be inputted to the planetary gear unit through the other one of the ring gear and the sun gear, and the driving force inputted through the ring gear or the sun gear may be outputted through carrier and drive the first pitch joint.

The independent actuator may be disposed adjacent to a rotary shaft of the first pitch joint, or be disposed at a position closer to the trunk than the rotary shaft of the first pitch joint.

The interlocking actuator may be disposed adjacent to a rotary shaft of the first pitch joint, or be disposed at a position closer to the trunk than the rotary shaft of the first pitch joint.

The first pitch joint may be a pitch direction hip joint, and the second pitch joint may be a knee joint.

In accordance with a further aspect, embodiments of the present invention provide a walking robot including a trunk, a thigh link, a calf link, a hip joint unit connecting the trunk and the thigh link, and a knee joint connecting the thigh link and the calf link, wherein the hip joint unit includes a yaw direction hip joint, a roll direction hip joint, and a pitch direction hip joint; and the pitch direction hip joint and the knee joint are interlocked with each other.

The walking robot may further include a power switch device provided with a first input shaft, a second input shaft, and an output shaft, and an output inputted to the first input shaft or the second input shaft may be transmitted to the output shaft, and thus drive the pitch direction hip joint.

In accordance with another aspect, embodiments of the present invention provide a robot including a planetary gear unit selectively transmitting driving power inputted into a first input shafts and a second input shaft into an output shaft, and a speed reducer including a third input shaft geared with the output shaft, wherein the planetary gear unit, and speed reducer cooperate to reduce an inertial force generated from legs of the robot while the robot is walking.

The planetary gear unit and the speed reducer may be interlocked with each other and may driven by an interlocking actuator.

The independent actuator may input power into the first input shaft, and an interlocking actuator may input power into the second input shaft.

A sun gear of the planetary gear unit and the independent actuator may rotate at the same angular velocity.

A ring gear of the planetary gear unit and the interlocking actuator may rotate at the same angular velocity.

The interlocking actuator may have a higher power output than the independent actuator.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
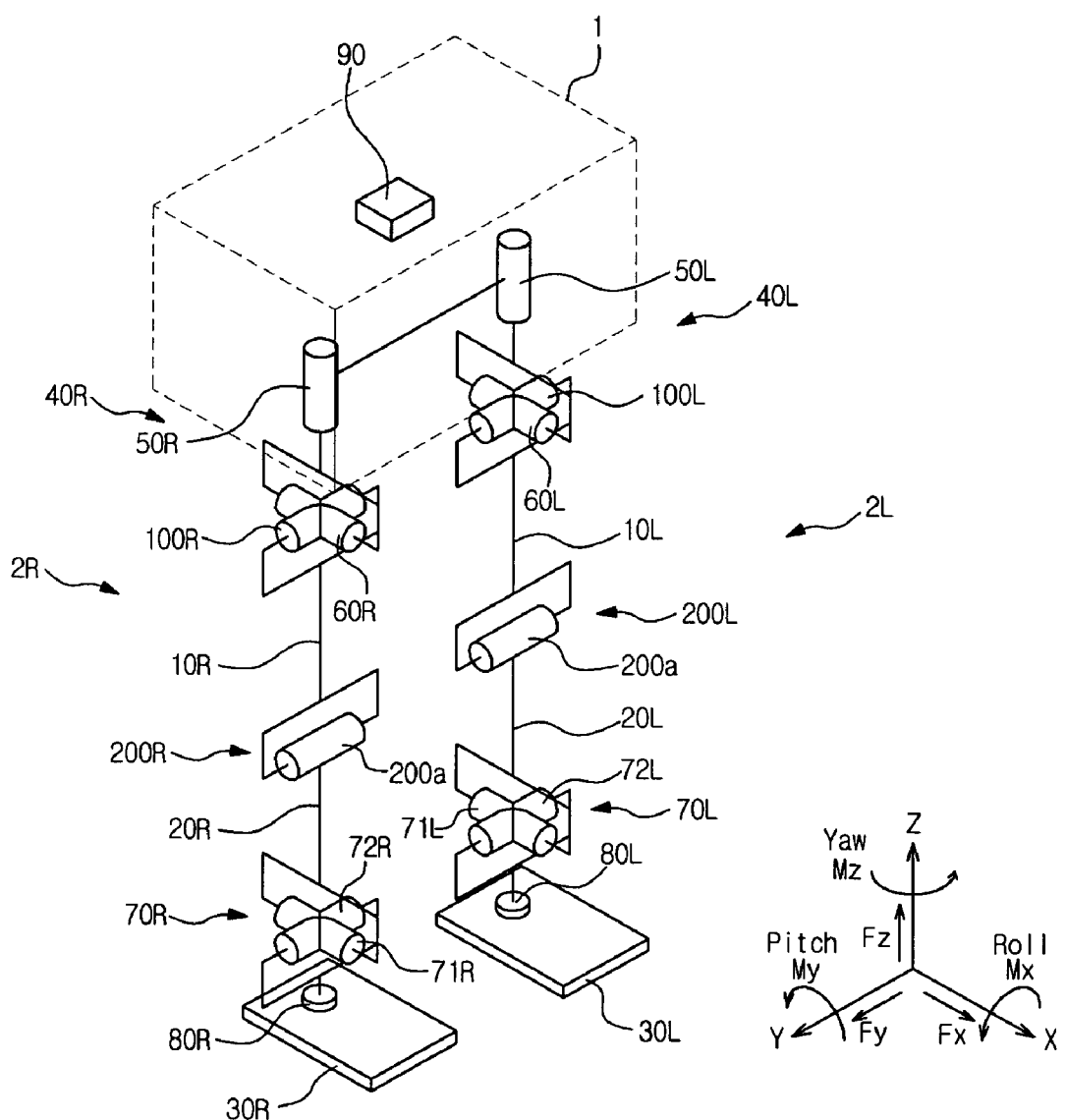
FIG. 1 illustrates a schematic perspective view of structures of joint units of legs of a walking robot in accordance with an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

FIG. 1 illustrates a schematic perspective view of structures of joint units of legs of a walking robot in accordance with an embodiment of the present invention.

As shown in FIG. 1, a robot of embodiments of the present invention includes legs 2L and 2R connected to both sides of the lower portion of a trunk 1. Here, L represents the left side, and R represents the right side.

Links, such as arms, a head, etc., are attached to the trunk 1, or separate devices, such as an input device, a display device, etc., are provided at the trunk 1.

The legs 2L and 2R respectively include thigh links 10L and 10R, calf links 20L and 20R provided at the lower portions of the thigh links 10L and 10R, feet 30L and 30R provided at the lower portions of the calf links 20L and 20R, hip joint units 40L and 40R connecting the trunk 1 and the thigh links 10L and 10R, knee joints 200L and 200R connecting the thigh links 10L and 10R and the calf links 20L and 20R, and ankle joint units 70L and 70R connecting the calf links 20L and 20R and the feet 30L and 30R.

The hip joint units 40L and 40R respectively include yaw direction hip joints 50L and 50R to rotate the thigh links 10L and 10R against the trunk 1 on the z-axis, roll direction hip joints 60L and 60R to rotate the thigh links 10L and 10R against the trunk 1 on the x-axis, and pitch direction hip joints 100L and 100R to rotate the thigh links 10L and 10R against the trunk 1 on the y-axis. Hereinafter, rotation in a yaw direction means rotation on the z-axis, rotation in a roll direction means rotation on the x-axis, and rotation in a pitch direction means rotation on the y-axis.

The knee joints 200L and 200R are pitch direction joints to rotate the calf links 20L and 20R against the thigh links 10L and 10R on the y-axis. The knee joints 200L and 200R have a rotary shaft 200a.

The ankle joint units 70L and 70R respectively include roll direction ankle joints 71L and 71R to rotate the feet 30L and 30R against the calf links 20L and 20R on the x-axis, and pitch direction ankle joints 72L and 72R to rotate the feet 30L and 30R against the calf links 20L and 20R on the y-axis.

Reference numerals 80L and 80R respectively represent six-axis force sensors provided between the ankle joint units 70L and 70R and the feet 30L and 30R. The six-axis force sensors 80L and 80R measure force components (Fx, Fy, Fz) of three directions and moment components (Mx, My, Mz) of three directions, and thus detect whether or not the legs 2L and 2R land and also measure a floor reaction force applied to the legs 2L and 2R. Reference numeral 90 represents an inclination sensor, which is installed on the trunk 1 to detect an inclination of the trunk 1 against the z-axis and an angular velocity of the trunk 1. Further, rotary encoders (not shown), attached to motors used to respectively drive the respective joints, detect the amount of rotation of the respective motors.

When data, generated by the six-axis force sensors 80L and 80R, the inclination sensor 90, and the rotary encoders, is inputted to a control unit (not shown), the control unit controls the respective motors based on the data, and thus various movements of the robot are achieved.

Hereinafter, in relation to the walking movement out of various movements achieved by the walking robot of embodiments of the present invention, driving structures of the hip joint unit and the knee joint of one leg, for example, the right leg 2R, will be described. Of course, the structures of the right leg 2R may be applied to the left leg 2L.

Figure 2:
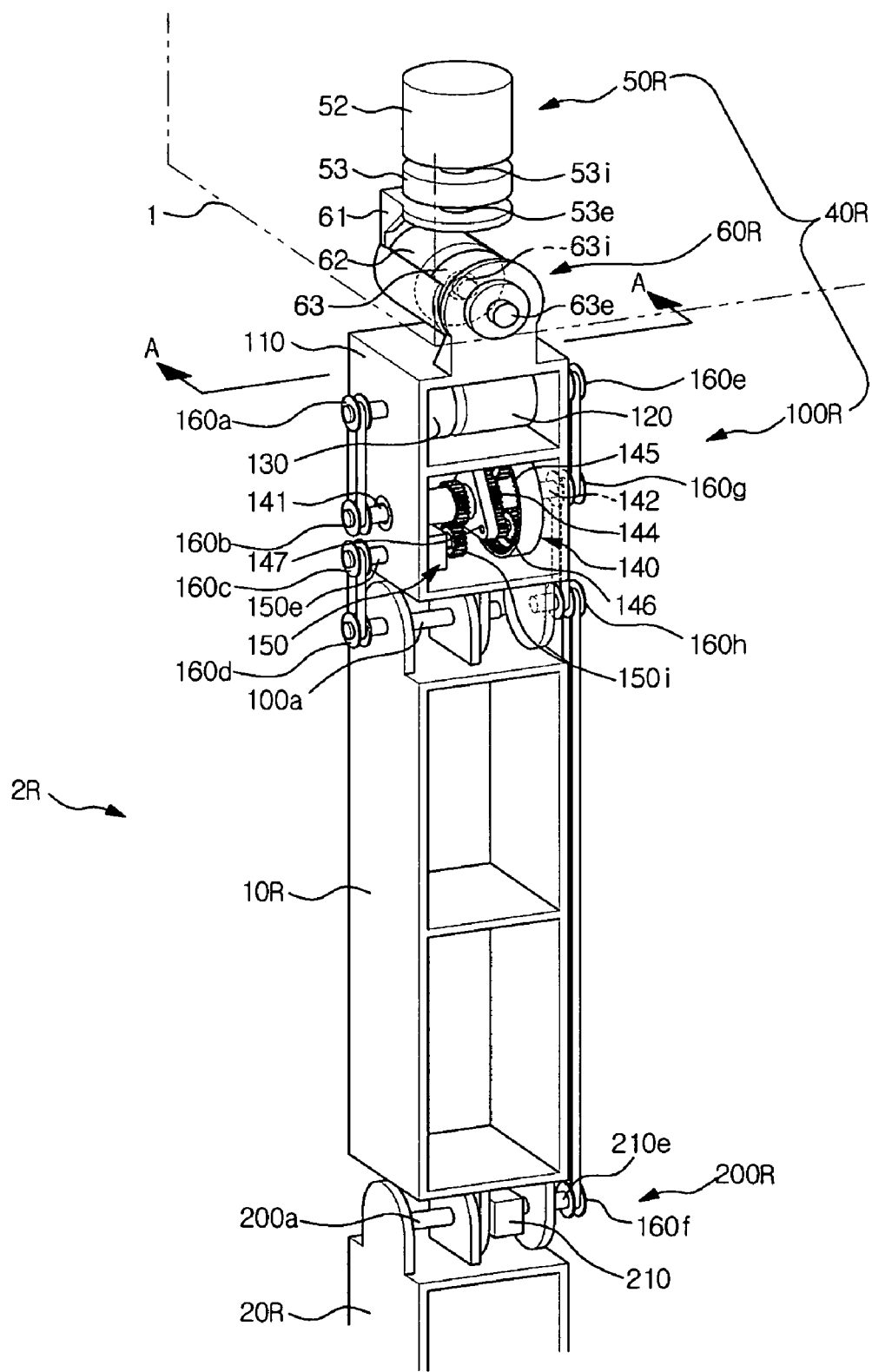
FIG. 2 illustrates a perspective view of a hip joint unit and a knee joint of a right leg of the walking robot in accordance with an embodiment of the present invention.
Figure 3:
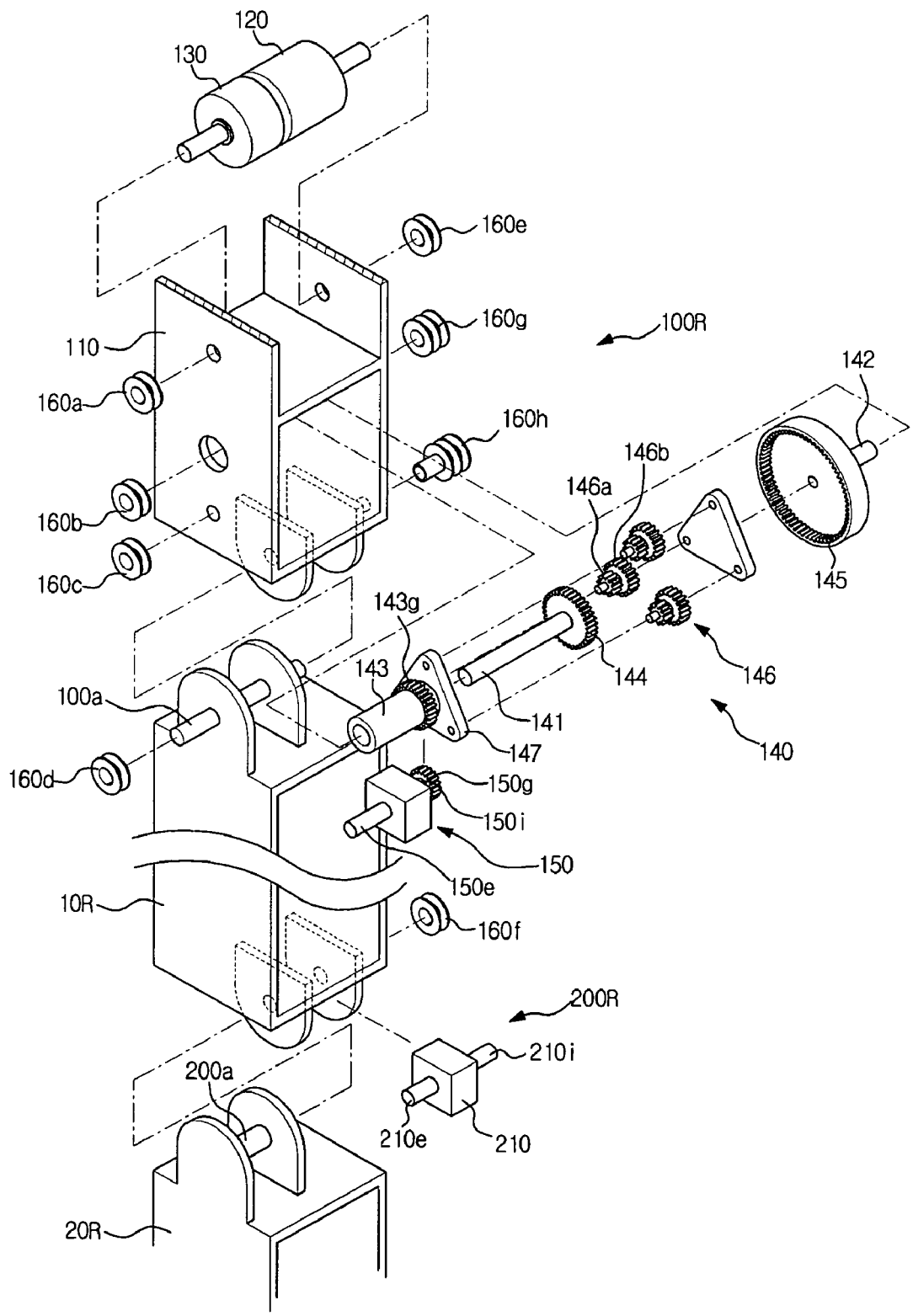
FIG. 3 illustrates an exploded perspective view of principal parts of the right leg shown in FIG. 2.
Figure 4:
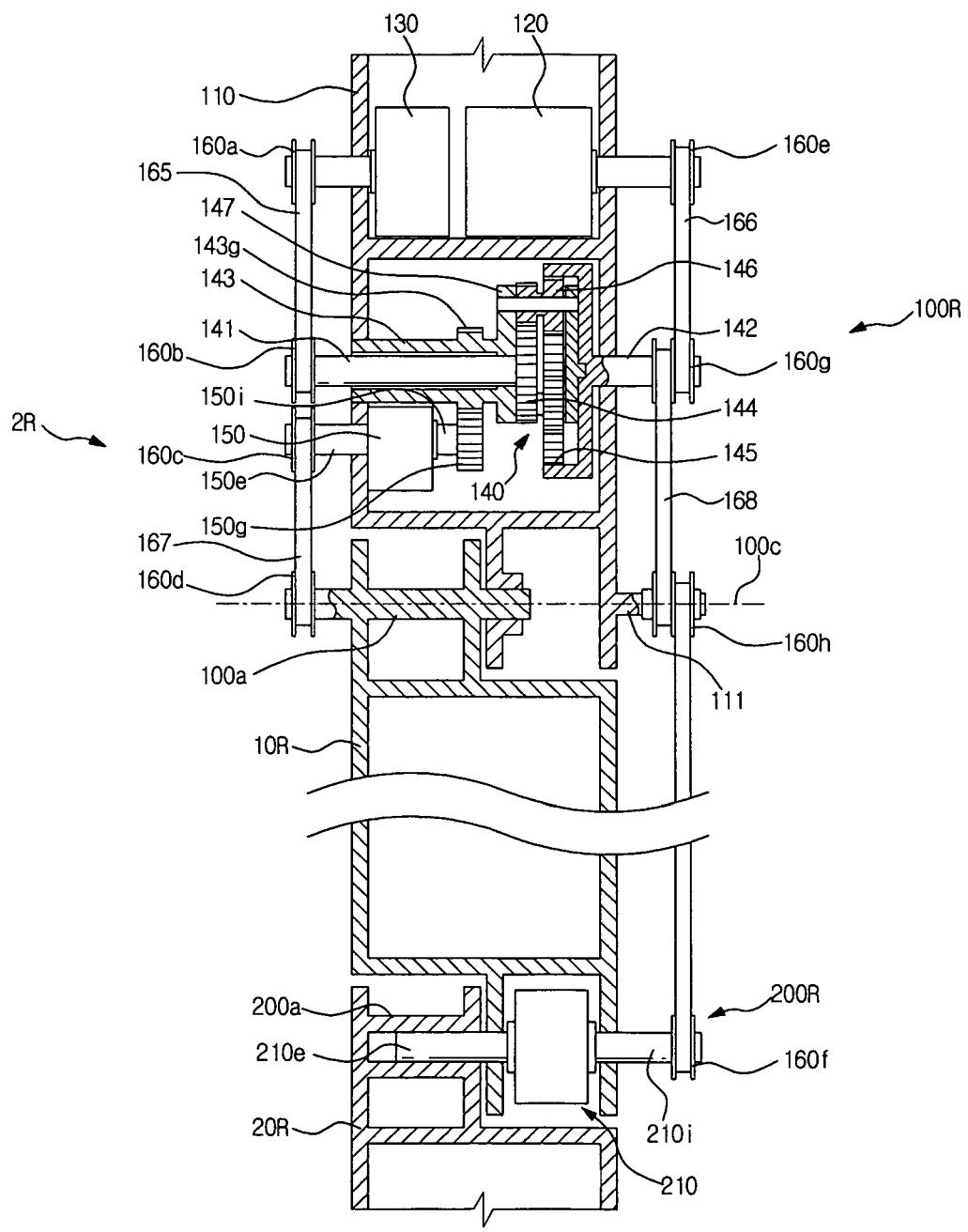
FIG. 4 illustrates a cross-sectional view taken along the line A-A of FIG. 2.

FIG. 2 illustrates a perspective view of a hip joint unit and a knee joint of a right leg 2R of the walking robot in accordance with an embodiment of the present invention, FIG. 3 illustrates an exploded perspective view of principal parts of the right leg shown in FIG. 2, and FIG. 4 illustrates a cross-sectional view taken along the line A-A of FIG. 2.

As shown in FIGS. 2 to 4, the right leg 2R includes the thigh link 10R, the calf link 20R provided at the lower portion of the thigh link 10R, the hip joint unit 40R connecting the trunk 1 and the thigh link 10R, and the knee joint 200R connecting the thigh link 10R and the calf link 20R. Here, the hip joint unit 40R includes the yaw direction hip joint 50R, the roll direction hip joint 60R, and the pitch direction hip joint 100R such that the thigh link 10R can move against the trunk 1 with 3 degrees of freedom. The knee joint 200R is provided such that the calf link 20R can be rotated against the thigh link 10R in the pitch direction.

The yaw direction hip joint 50R serves to rotate the thigh link 10R against the trunk 1 on the z-axis, and includes an actuator 52, which is supported by the trunk 1 and generates driving force, and a speed reducer 53, which is supported by the trunk 1 and provided with an input shaft 53i connected to the actuator 52 and an output shaft 53e connected to a roll direction hip joint frame 61, which will be described later. Here, the actuator 52 is an electric motor generating rotary power, and the speed reducer 53 is a well-known harmonic drive. Hereinafter, actuators and speed reducers provided in the walking robot of this embodiment are the same as the above unless other examples are referred to.

When the actuator 52 of the yaw direction hip joint 50R is operated, the rotary power generated from the actuator 52 is transmitted to the speed reducer 53, and thus the structure under the roll direction hip joint frame 61 rotates in the yaw direction.

The roll direction hip joint 60R serves to rotate the thigh link 10R against the trunk 1 on the x-axis, and includes the roll direction hip joint frame 61, an actuator 62, which is supported by the roll direction hip joint frame 61 and generates driving force, and a speed reducer 63, which is supported by the roll direction hip joint frame 61 and provided with an input shaft 63i connected to the actuator 62 and an output shaft 63e connected to a pitch direction hip joint frame 110, which will be described later.

Thus, when the actuator 62 of the roll direction hip joint 60R is operated, the rotary power generated from the actuator 62 is transmitted to the speed reducer 63, and thus the structure under the pitch direction hip joint frame 110 rotates in the roll direction.

The pitch direction hip joint 100R includes the pitch direction hip joint frame 110, an interlocking actuator 120 and an independent actuator 130, which are supported by the pitch direction hip joint frame 110 and generate driving power, a planetary gear unit 140 provided with first and second input shafts 141 and 142, to which driving power generated from the interlocking actuator 120 and the independent actuator 130 is inputted, and an output shaft 143, from which the inputted driving power is outputted, and a speed reducer 150, which is supported by the pitch direction hip joint frame 110 and provided with an input shaft 150i geared with the output shaft 143 of the planetary gear unit 140 and an output shaft 150e connected to a rotary shaft 100a of the pitch direction hip joint 100R by a belt 167. Reference numerals 143g and 150g respectively represent gears, which are respectively fixed to the output shaft 143 of the planetary gear unit 140 and the input shaft 150i of the speed reducer 150 and are engaged with each other.

The planetary gear unit 140 of this embodiment includes a sun gear 144, to which the first input shaft 141 is axially connected, a ring gear 145 provided at the outside of the sun gear 144 such that the second input shaft 142 is axially connected to the ring gear 145, a plurality of planet gears 146 engaged with the sun gear 144 and the ring gear 145 such that the planet gears 146 rotate and revolve, and a carrier 147 provided with one side, to which the plurality of the planet gears 146 is rotatably connected, and the other side, to which the output shaft 143 is axially connected. Each of the planet gears 146 includes a first planet gear 146a engaged with the sun gear 144 and a second planet gear 146b engaged with the ring gear 145. The first and second planet gears 146a and 146b are axially connected to each other, and thus the first and second planet gears 146a and 146b rotate at the same angular velocity.

The first input shaft 141 of the planetary gear unit 140 is connected to the rotary shaft of the independent actuator 130 by a belt 165, the second input shaft 142 of the planetary gear unit 140 is connected to the rotary shaft of the interlocking actuator 120 by a belt 166, and the output shaft 142 of the planetary gear unit 140 is geared with the input shaft 150i of the speed reducer 150 connected to the rotary shaft 100a of the pitch direction hip joint 100R, as described above. Thus, the planetary gear unit 140 of this embodiment serves as a power switch device, which transmits selectively the driving power, inputted to the first input shaft 141, and the driving power, inputted to the second input shaft 142, to the output shaft 143.

Further, the planetary gear unit 140 of this embodiment satisfies Expression 1 below.

$$\frac{\omega_{ring} - \omega_{carrier}}{\omega_{sun} - \omega_{carrier}} = -\frac{N_{sun} \times N_{planet-ring}}{N_{planet-sun} \times N_{ring}} \qquad \text{Expression 1}$$

Here, $\omega_{sun}$ is the angular velocity of the sun gear, $\omega_{ring}$ is the angular velocity of the ring gear, $\omega_{carrier}$ is the angular velocity of the carrier, $N_{sun}$ is the number of saw teeth of the sun gear, $N_{ring}$ is the number of saw teeth of the ring gear, $N_{planet-sun}$ is the number of saw teeth of the first planet gear, and $N_{planet-ring}$ is the number of saw teeth of the second planet gear.

The knee joint 200R includes a speed reducer 210, which is supported by the thigh link 10R and provided with an output shaft 210e connected to a rotary shaft 200a of the knee joint 200R. As shown in FIGS. 2 to 4, the second input shaft 142 driven by the interlocking actuator 120 is connected to the input shaft 210i of the speed reducer 210 by a belt 168 through a pulley 160h rotatably connected to a central shaft 111 of the pitch direction hip joint frame 110. As a result, the input shaft 210i of the speed reducer 210 is connected to the rotary shaft of the interlocking actuator 120 and the output shaft 210e of the speed reducer 210 is connected to the rotary shaft 200a of the knee joint 200R, and thus the knee joint 200R is driven by the interlocking actuator 120. Here, in order to uniformly maintain the tensile strength of a belt 168 connecting the central shaft 111 of the pitch direction hip joint frame 110 and the input shaft 210*i* of the speed reducer 210, the central shaft 111 of the pitch direction hip joint frame 110 has the same center of rotation 100*c* as the rotary shaft 100*a* of the pitch direction hip joint 100R.

Reference numerals 160*a* to 160*g* respectively represent pulleys fixed to the rotary shaft of the independent actuator 130, the first input shaft 141, the output shaft 150*e* of the speed reducer 150, the rotary shaft 100*a* of the pitch direction hip joint 100R, the rotary shaft of the interlocking actuator 120, the input shaft 210*i* of the speed reducer 210, and the second input shaft 142, such that the pulleys 160*a* to 160*g* can be rotated together with the shafts. Here, the pulley 160*h* and the pulley 160*g* have a structure obtained by axially connecting two unit pulleys so as to transmit power.

Figure 5:
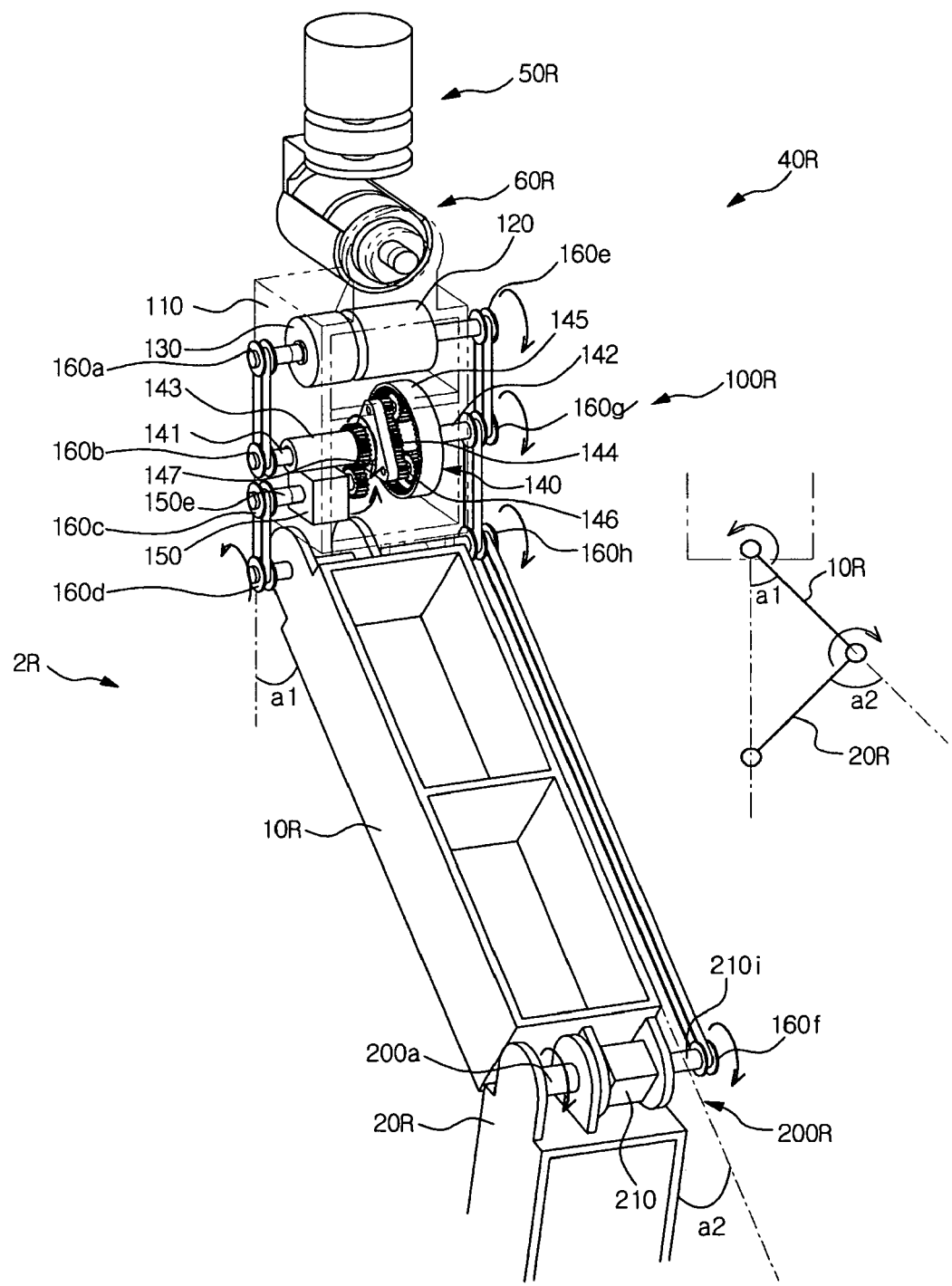
FIGS. 5 and 6 illustrate perspective views of movements of a pitch direction hip joint and a knee joint of the right leg of the walking robot in accordance with an embodiment of the present invention.
Figure 6:
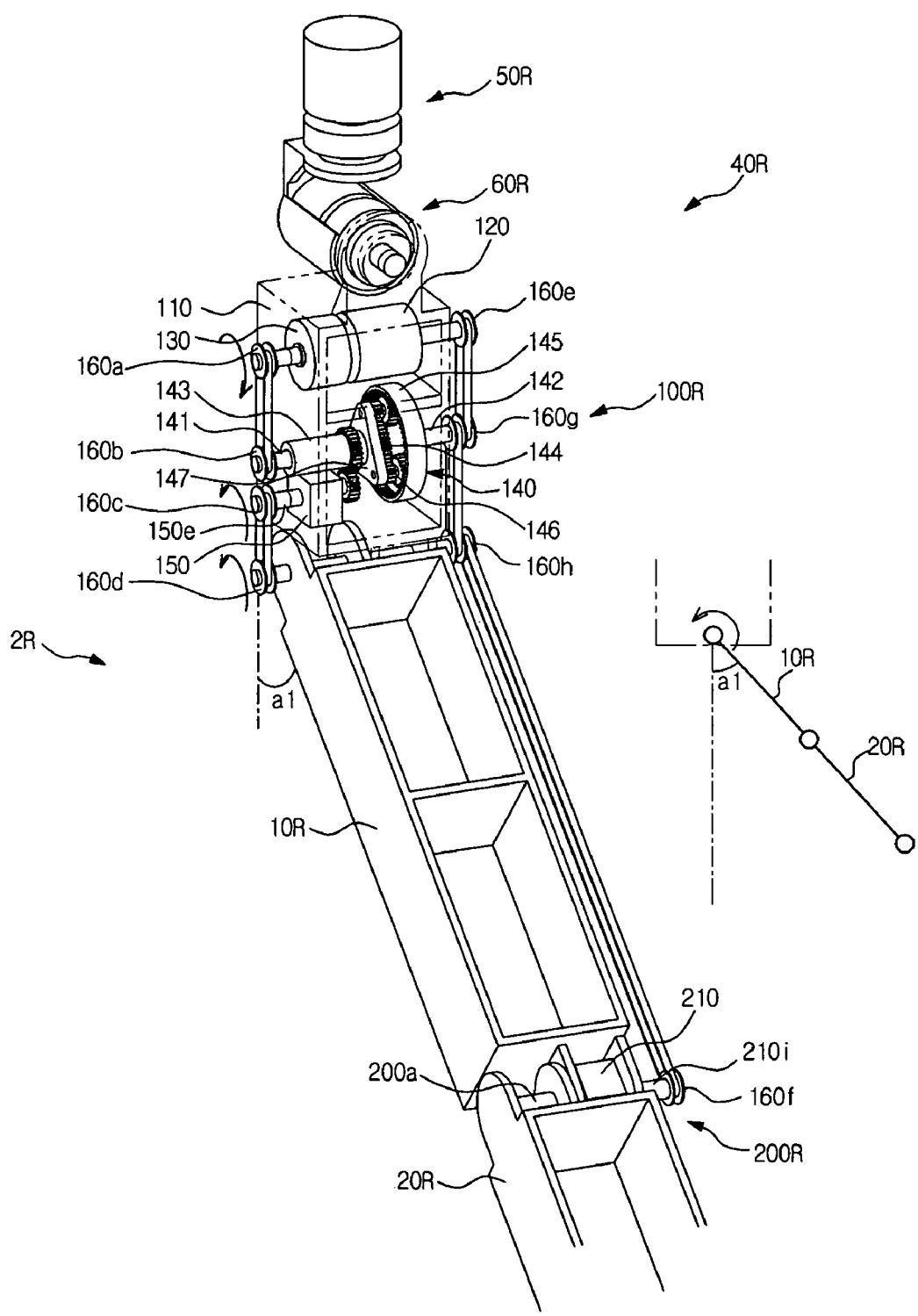

FIGS. 5 and 6 illustrate perspective views of movements of a pitch direction hip joint and a knee joint of the right leg of the walking robot in accordance with embodiments of the present invention.

Hereinafter, an interlocking structure of the pitch direction hip joint 100R and the knee joint 200R of the walking robot in accordance with an embodiment of the present invention will be described in detail using Expression 1 above, together with FIGS. 5 and 6. For convenience of understanding, it is supposed that the sun gear 144 is connected to the rotary shaft of the independent actuator 130 so that the sun gear 144 can rotate at the same angular velocity as that of the independent actuator 130, the ring gear 145 is connected to the rotary shaft of the interlocking actuator 120 so that the ring gear 145 can rotate at the same angular velocity as that of the interlocking actuator 120, and the pulleys and the gears are connected so that a rotating angle a1 of the thigh link 10R against the trunk is proportionate to the angular velocity of the carrier 147 and a rotating angle a2 of the calf link 20R against the thigh link 10R is proportionate to the angular velocity of the ring gear 144.

In case that the independent actuator 130 is stopped and only the interlocking actuator 120 is operated, the pitch direction hip joint 100R and the knee joint 200R are driven simultaneously.

Specifically, when the interlocking actuator 120 is driven in the clockwise direction, as shown in FIG. 5, the ring gear 145 and the planet gears 146 respectively rotate and revolve in the clockwise direction, and the input shaft 150*i* (FIG. 4) of the speed reducer 150 geared with the output shaft 143 of the planetary gear unit 140, and the output shaft 150*e* of the speed reducer 150 rotate in the counterclockwise direction and thus the thigh link 10R rotates in the counterclockwise direction. Simultaneously, the calf link 20R connected to the second input shaft 142 of the ring gear 145 through the pulley 160*h* and the speed reducer 210 rotates in the clockwise direction. Thereby, the movement of the leg, as shown in FIG. 5, is achieved.

For example, when it is supposed that the rotating angle a1 of the thigh link 10R doubles the rotating angle a2 of the calf link 20R (i.e., since it is supposed that the rotating angle of the thigh link and the rotating angle of the calf link are respectively proportionate to the angular velocity of the carrier and the angular velocity of the ring gear, a relation of $\omega_{ring}=2\omega_{carrier}$ is obtained.). Accordingly, Expression 2 below can be obtained from Expression 1. Here, since the independent actuator 130 is in a stoppage state, a value of $\omega_{sun}$ is zero.

$$\frac{N_{sun} \times N_{planet-ring}}{N_{planet-sun} \times N_{ring}} = 1 \qquad \text{Expression 2}$$

That is, in case that the numbers of saw teeth of the sun gear 144, saw teeth of the ring gear 145, and saw teeth of the first and second planet gears 146*a* (FIG. 3) and 146*b* (FIG. 3) are adjusted to obtain the relation of Expression 2 above, when the interlocking actuator 120 is operated on condition that the independent actuator 130 is stopped, the calf link 20R rotates at an angle, which is twice as large as the rotating angle a1 of the thigh link 10R in the direction opposite to the rotating direction of the thigh link 10R. When the joints of the left and right legs are operated, as described above, the sitting movement of the robot is achieved.

As shown in FIG. 5, when the independent actuator 130 is operated on condition that the interlocking actuator 120 is stopped, the thigh link 10R rotates in the direction opposite to the rotating direction of the independent actuator 130 and the calf link 20R does not rotate against the thigh link 10R.

Under the condition of Expression 2, when the independent actuator 130 and the interlocking actuator 120 are operated simultaneously, Expression 3 below can be obtained from Expression 1.

$$2 \times \omega_{carrier} = \omega_{ring} + \omega_{sun} \qquad \text{Expression 3}$$

Thus, by operating the independent actuator 130 and the interlocking actuator 120 simultaneously, it is possible to rotate the pitch direction hip joint 100R and the knee joint 200R together, and to achieve the complicated movement of the walking robot and to precisely control the movement of the walking robot.

As described above, the driving force generated from the interlocking actuator 120 is transmitted to the pitch direction hip joint 100R through the planetary gear unit 140 and to the knee joint 200R through the pulley 160*h*, simultaneously. That is, the pitch direction hip joint 100R and the knee joint 200R are driven by one interlocking actuator 120 on condition that they are interlocked with each other.

Thereby, the control of the pitch direction hip joint 100R and the knee joint 200R in the walking robot in accordance with an embodiment of the present invention is simplified. Specifically, the movement of the walking robot obtained by simultaneously driving the pitch direction hip joint 100R and the knee joint 200R, such as running, walking, or sitting, can be achieved by controlling only one actuator, and thus the control mechanism of the walking robot is simplified. Particularly, it is possible to effectively alleviate an impact transmitted from the ground to the walking robot by controlling one actuator, in the walking movement, such as running or walking.

Further, since the interlocking actuator 120 drives the pitch direction hip joint 100R and the knee joint 200R, interlocked with each other, and as well the independent actuator 130 independently drives the pitch direction hip joint 100R disposed adjacent to the pitch direction hip joint 100R, the inertial force generated from the leg during walking of the walking robot is highly reduced, and thus the power output required to drive the leg is reduced.

Further, among the two actuators used to rotate the thigh link 10R and the calf link 20R in the pitch direction, one actuator can be replaced with an actuator having a low power output. Specifically, since the interlocking actuator 120 having a high power output is driven during movement such as running or sitting, to which a large vertical load and a large torque are applied to the pitch direction hip joint 100R and the knee joint 200R, and the independent actuator 130 having a relatively low power output is driven while the thigh link 10R rotates by driving only the pitch direction hip joint 100R, then, the independent actuator 130 can be replaced with a motor having a low power output.

Although embodiments of the present invention presented herein describe the interlocking structure of two pitch joints connected by a link in the biped walking robot, the interlocking structure of the two joints of embodiments of the present invention may be applied to various walking robots including a quadruped walking robot.

Further, the interlocking structure of the pitch direction hip joint and the knee joint of embodiments of the present invention may be modified into various types.

For example, although an embodiment of the present invention describes the pitch direction hip joint 100R connected to the trunk 1 through the yaw direction hip joint 50R and the roll direction hip joint 60R, the pitch direction hip joint 100R may be connected directly to the trunk 1 (FIG. 2). The number of joints interposed between the trunk 1 (FIG. 2) and the pitch direction hip joint 100R is not limited.

Further, although an embodiment of the present invention describes the independent actuator 130 and the interlocking actuator 120, which are disposed at a position being closer to the trunk 1 (FIG. 2) than the rotary shaft 100a (FIG. 2) of the pitch direction hip joint 100R, the independent actuator 130 and the interlocking actuator 120 may be disposed at a position being more distant from the trunk 1 (FIG. 2) than the rotary shaft 100a (FIG. 2) of the pitch direction hip joint 100R. However, in consideration of the inertial force generated from the leg while walking, the independent actuator 130 and the interlocking actuator 120 are disposed adjacent to the rotary shaft 100a (FIG. 2) of the pitch direction hip joint 100R or are disposed at a position closer to the trunk 1 than the rotary shaft 100a of the pitch direction hip joint 100R.

Further, although an embodiment of the present invention describes the independent actuator 130 connected to the sun gear 144 and the interlocking actuator 120 connected to the ring gear 145, the interlocking actuator 120 may be connected to the sun gear 144 and the independent actuator 130 may be connected to the ring gear 145. In this case, the knee joint 200R is connected to the first input shaft 141 connected to the sun gear 144.

Further, although the walking robot of embodiments of the present invention includes the speed reducer 150 connecting the output shaft 143 of the planetary gear unit 140 and the rotary shaft 100a (FIG. 2) of the pitch direction hip joint 100R, the planetary gear unit 140 may serve as a speed reducer without use of any separate speed reducer. However, in this case, a separate power transmission structure is required such that the rotating direction of the pitch direction hip joint 100R and the rotating direction of the knee joint 200R are opposite to each other.

Moreover, components, such as a bearing supporting the rotary shaft, may be additionally required.

As apparent from the above description, embodiments of the present invention provide a walking robot, which simplifies the control of pitch direction hip joints and knee joints.

The inertial force generated from a leg of the walking robot while walking is highly decreased, and thus an output power required to drive the leg is reduced.

Among two actuators to rotate a thigh link and a calf link of the leg in the pitch direction, one actuator can be replaced with an actuator having a low output.

Although embodiments of the invention have been shown and described, it would be appreciated by those skilled in the art that changes may be made in these embodiments without departing from the principles and spirit of the invention, the scope of which is defined in the claims and their equivalents.

What is claimed is:

1. A walking robot comprising:
    a trunk;
    a plurality of legs connected to the trunk;
    an interlocking actuator, and
    wherein:
        at least one leg among the plurality of legs includes a thigh link, a calf link provided at a lower portion of the thigh link, a pitch direction hip joint connecting the trunk and the thigh link and rotating the thigh link against the trunk in a pitch direction, and a knee joint connecting the thigh link and the calf link and rotating the calf link against the thigh link in the pitch direction; and
        the pitch direction hip joint and the knee joint are interlocked with each other and are driven by the interlocking actuator
        an independent actuator independently driving the pitch direction hip joint;
        wherein the interlocking actuator is disposed adjacent to a rotary shaft of the pitch direction hip joint, or is disposed at a position closer to the trunk than the rotary shaft of the pitch direction hip joint.

2. The walking robot according to claim 1, further comprising a planetary gear unit including a sun gear, a ring gear provided at an outside of the sun gear, a plurality of planet gears engaged with the sun gear and the ring gear such that the planet gears rotate and revolve, and a carrier connected to the plurality of planet gears,
    wherein a driving force of the interlocking actuator is inputted to the planetary gear unit through any one of the ring gear and the sun gear and is transmitted to the knee joint simultaneously, a driving force of the independent actuator is inputted to the planetary gear unit through the other of the any one of the ring gear and the sun gear, and the driving force inputted through the ring gear or the sun gear is outputted through the carrier and drives the pitch direction hip joint.

3. The walking robot according to claim 2, wherein each of the plurality of planet gears includes a first planet gear engaged with the sun gear and a second planet gear engaged with the ring gear, and the first and second planet gears are axially connected to each other.

4. The walking robot according to claim 2, wherein the planetary gear unit comprises an output shaft and the pitch direction hip joint comprises a rotating shaft, the walking robot further comprising a speed reducer provided with an input shaft connected to the output shaft of the planetary gear unit and an output shaft connected to the rotary shaft of the pitch direction hip joint.

5. The walking robot according to claim 2, wherein the interlocking actuator comprises a rotary shaft and the knee joint comprises a rotary shaft, the walking robot further comprising a speed reducer provided with an input shaft connected to the rotary shaft of the interlocking actuator and an output shaft connected to the rotary shaft of the knee joint.

6. The walking robot according to claim 2, further comprising a frame provided with one side connected to the trunk and another side rotatably connected to the thigh link,
    wherein the planetary gear unit is supported by the frame.

7. The walking robot according to claim 1, wherein the pitch direction hip joint comprises a rotary shaft, and the independent actuator is disposed adjacent to the rotary shaft of the pitch direction hip joint, or is disposed at a position closer to the trunk than the rotary shaft of the pitch direction hip joint.

8. The walking robot according to claim 1, wherein the pitch direction hip joint and, the knee joint are interlocked with each other such that rotating directions of the pitch direction hip joint and the knee joint differ from each other.

9. The walking robot according to claim 1, further comprising at least one joint interposed between the trunk and the pitch direction hip joint.

10. A walking robot comprising:
- a plurality of legs, each of which includes a first pitch joint and a second pitch joint interlocked with each other;
- an interlocking actuator driving the first pitch joint and the second pitch joint simultaneously; and
- an independent actuator independently driving the first pitch joint;
- wherein the first pitch joint comprises a rotary shaft, and wherein the interlocking actuator is disposed adjacent to the rotary shaft of the first pitch joint, or is disposed at a position closer to the trunk than the rotary shaft of the first pitch joint.

11. The walking robot according to claim 10, further comprising a planetary gear unit including a sun gear, a ring gear provided at the outside of the sun gear, a plurality of planet gears engaged with the sun gear and the ring gear such that the planet gears rotate and revolve, and a carrier connected to the plurality of planet gears,
- wherein a driving force of the interlocking actuator is inputted to the planetary gear unit through any one of the ring gear and the sun gear and is transmitted to the second pitch joint simultaneously, a driving force of the independent actuator is inputted to the planetary gear unit through the other of the any one of the ring gear and the sun gear, and the driving force inputted through the ring gear or the sun gear is outputted through the carrier and drives the first pitch joint.

12. The walking robot according to claim 10, wherein the first pitch joint comprises a rotary shaft, and wherein the independent actuator is disposed adjacent to the rotary shaft of the first pitch joint, or is disposed at a position closer to the trunk than the rotary shaft of the first pitch joint.

13. The walking robot according to claim 10, wherein the first pitch joint is a pitch direction hip joint, and the second pitch joint is a knee joint.

14. A robot comprising:
- a first input shaft;
- a second input shaft;
- an output shaft;
- a plurality of legs;
- a planetary gear unit selectively transmitting driving power inputted into the first input shaft and the second input shaft into the output shaft; and
- a speed reducer including a third input shaft geared with the output shaft;
- wherein the planetary gear unit, and speed reducer cooperate to reduce an inertial force generated from the legs of the robot while the robot is walking.

15. The robot according to claim 14, wherein the robot further comprises an interlocking actuator, and the planetary gear unit and the speed reducer are interlocked with each other and are driven by the interlocking actuator.

16. The robot according to claim 14, wherein the robot further comprises:
- an independent actuator inputting power into the first input shaft; and
- an interlocking actuator inputting power into the second input shaft.

17. The robot according to claim 16, wherein the planetary gear unit comprises a sun gear, and the sun gear and the independent actuator rotate at the same angular velocity.

18. The robot according to claim 17, wherein the planetary gear unit comprises a ring gear, and the ring gear and the interlocking actuator rotate at the same angular velocity.

19. The robot according to claim 16, wherein the interlocking actuator has a higher power output than the independent actuator.

\* \* \* \* \*

UNITED STATES PATENT AND TRADEMARK OFFICE
CERTIFICATE OF CORRECTION

PATENT NO.         : 8,327,959 B2
APPLICATION NO.    : 12/385263
DATED              : December 11, 2012
INVENTOR(S)        : Youn Baek Lee et al.

It is certified that error appears in the above-identified patent and that said Letters Patent is hereby corrected as shown below:

In the Claims:

Column 10; Line 62; In Claim 8, delete "and," and insert -- and --, therefor.

Signed and Sealed this
Fourteenth Day of May, 2013

Teresa Stanek Rea
*Acting Director of the United States Patent and Trademark Office*